INVENTOR
HAROLD S. PETERSON
HAROLD A. ANDERSON
BY
Charles C. Willson
ATTORNEY

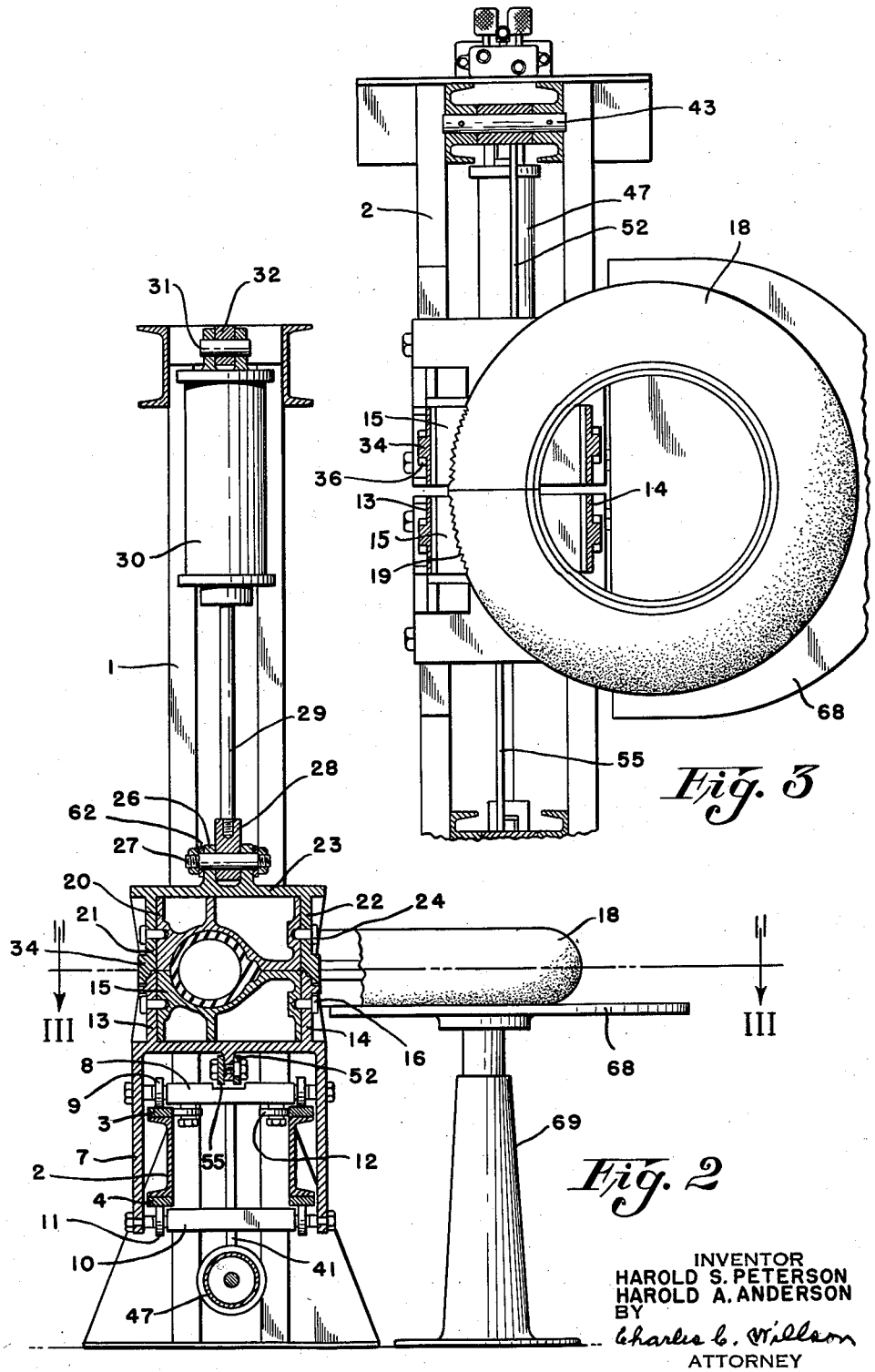

Patented June 6, 1950

2,510,715

UNITED STATES PATENT OFFICE 2,510,715

CURING BAG SPLICING MACHINE

Harold S. Peterson and Harold A. Anderson, Eau Claire, Wis., assignors to United States Rubber Company, New York, N. Y., a corporation of New Jersey Application July 30, 1946, Serial No. 687,098

6 Claims. (Cl. 154—9)

This invention relates to a machine for splicing tire curing bags, and in particular it relates to an apparatus for joining together the ends of tubes to form tire curing bags by employing a butt splicing method.

In the manufacture of pneumatic tires, it is customary to use a heavy inner tube which is placed within the tire during the vulcanizing operation. This heavy tube is usually referred to as a water bag or curing bag. In the tire industry curing bags are made by extruding a tubular length of rubber or synthetic rubber stock having a cross sectional profile substantially similar to the cross sectional profile of the inner perimeter of the pneumatic tire in which the curing bag is used. The curing bag material may be extruded in a straight tube or it may be extruded in a helical tubular formation. The tubes that form the curing bags are cut to the desired length and the ends spliced together to form an annular tube. In making curing bag splices it has generally been the practice to skive the ends of the tube that is to form the curing bag so as to permit these ends to overlap one inside the other in a telescopic manner. Thereafter, the splice so made is stitched together by hand so that the unvulcanized rubberlike materials will bond or knit together.

While butt splicing has heretofore been used in connection with tire curing bags, it has been both difficult and awkward to produce a satisfactory butt splicer. We have provided an apparatus which is capable of securely gripping the end portions of a tube that is to form a curing bag and of moving the end portions together in butt relationship so as to form an accurately alined homogeneous splice. In general, our invention comprises means for supporting a curing bag in a horizontal position in combination with a pair of clamping jaws adapted to grip the ends of the tube that forms the curing bag, and means for moving the gripping devices together at a predetermined rate and in proper alinement so as to form a uniform and accurate butt splice.

It is, therefore, among the objects of our invention to provide a curing bag splicing machine which is capable of securely gripping the end portions of a tube that is to form a curing bag; to provide a curing bag splicing machine which is capable of moving the ends of a tube that is to form a curing bag together in accurate alinement and to maintain pressure on the butt assembly until the splice becomes homogeneous; and to provide a curing bag butt splicing machine which may be operated quickly and efficiently and which may be manufactured economically.

These and other objects and advantages will appear more fully in the following detailed description when considered in connection with the accompanying drawings, in which:

Figure 2 is a vertical view in section taken along line II—II of Figure 1; and

Figure 3 is a transverse view in section taken along lines III—III of Figure 2.

Figure 1:
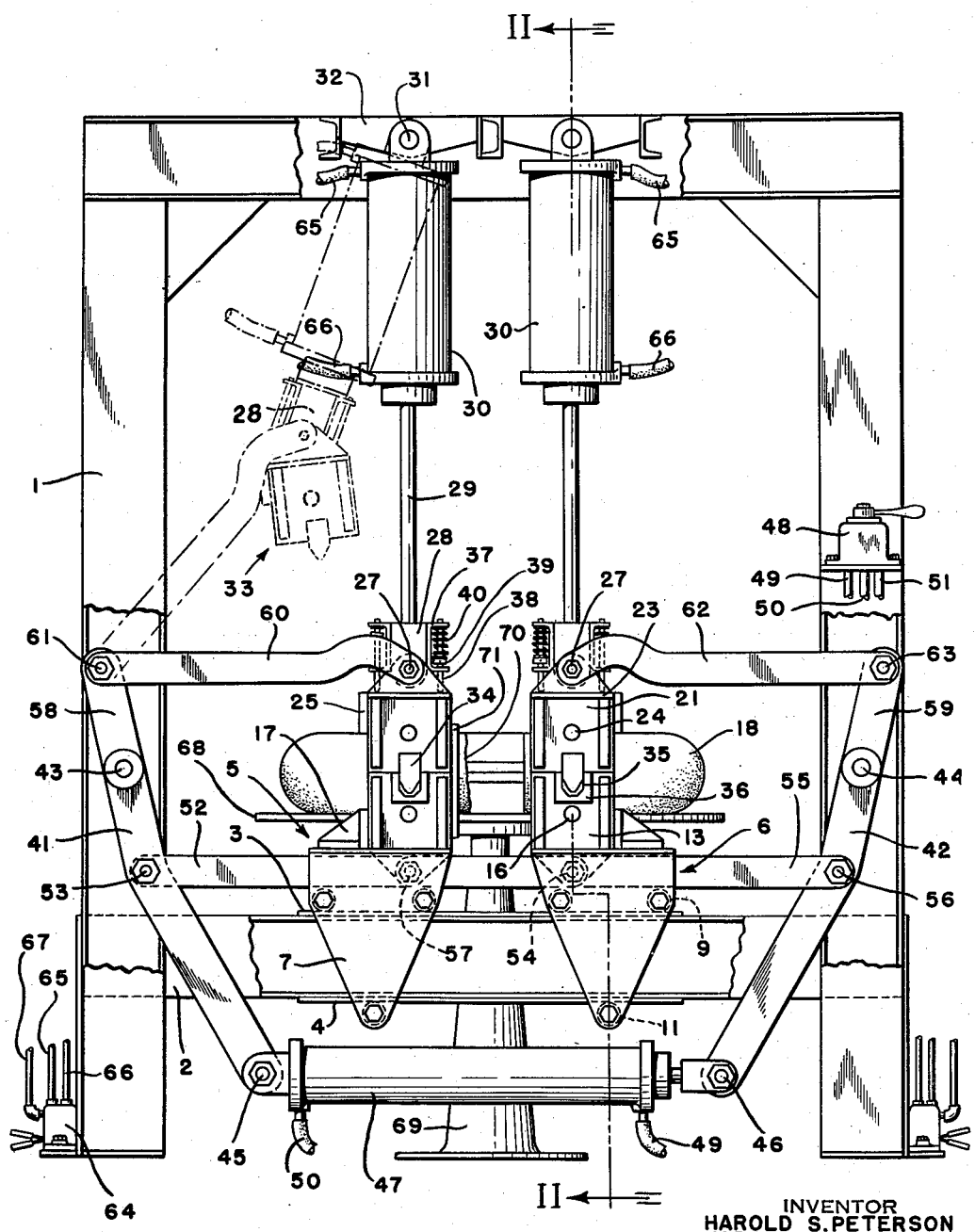
Figure 1 is a side elevational view, partly broken away, of a butt splicing machine illustrating one embodiment of our invention.

With reference to the drawings and in particular to Figure 1, we show a curing bag butt splicing machine constituting an embodiment of our invention and illustrating a structural frame 1 which is in the form of an inverted U-shaped support.

Cross members 2 secured to the opposite sides of the uprights 1 complete the structural frame work. Located at the upper and lower sides of the cross members 2 are plates 3 and 4 respectively which function as tracks, and upon these tracks the carriages 5 and 6 are horizontally moveable.

Since the carriages 5 and 6 are identical, only one of the carriages is herein described. Essentially the carriage 5 comprises an inverted U-shaped frame 7 (Figure 2) adapted to straddle the spaced cross members 2. A pair of shafts 8 extend across the carriage frame work 7, above the members 2, and support a pair of rolls 9 which engage with the track 3. Preferably these rolls are conventional ball bearing type rolls. A second shaft 10 extends across the carriage at the bottom thereof and is provided with rolls 11 which engage with the bottom track 4. These sets of rolls 9 and 11 provide an adequate rolling support for the carriage 5 and prevent the carriage from tipping or from being raised vertically. In order to prevent lateral movement of the carriage, we provide a pair of rolls 12 attached to the shaft 8 and adapted for engagement with the inner side of the track 3. Extending upwardly from the carriage 5 is a pair of walls 13 and 14 adapted to function as retaining walls for the reception of a removable jaw 15. Pins 16 are manually inserted in the retaining walls 13 and 14 for locking the jaw 15 in proper position. At one end of the retaining walls 13 and 14 is a bracket 17 (Figure 1) adapted to form an end support for the jaw 15. This completes the general structure of the carriages 5 and 6 and the retaining structure for the lower clamping jaws.

These clamping jaws 15 constitute the lower members for gripping a curing bag 18 during the butt splicing operation. Essentially each jaw 15 is formed of metal such as an aluminum casting and has a clamping surface which is substantially equal to the lower half of a cross-sectional perimeter of the curing bag. Preferably the gripping surface of each jaw 15 is slightly less than the dimension of the curing bag so as to insure a good gripping action on the curing bag. To increase this gripping action we have found it desirable to provide each jaw with a plurality of serrations 19 (Figure 3) to prevent slippage of the curing bag when retained by the jaws 15. The jaws 15 are replaceable by jaws of different dimensions so that the apparatus may be used for butt splicing different sizes of curing bags. To complete the curing bag gripping mechanism an upper jaw 20 of similar shape and size operates in mating relationship with each lower jaw 15 for gripping the upper portion of the curing bag 18. A supporting frame work for the jaw 20 (Figure 2) constitutes side walls 21 and 22 secured to a top wall 23. Pins 24 passing through the walls 21 and 22 retain the jaw 20 in proper position, and a plate 25 (Figure 1) functions as an end retaining wall.

In accordance with the present invention the butt-splicing operation is performed while the unvulcanized tube that is to form the curing bag 18 is in the shape of an annulus and is round in cross-section, as shown in the drawings, and the bag 18 is supported in a horizontal position during the splicing operation. Each jaw 15 and 20 is made relatively wide so that the cooperating jaws when brought together will grip a substantial length of the round tube 18 near an end thereof. The jaws 15 and 20 are so shaped that they conform to the horizontal and vertical curves of the bag as it lies in a horizontal position. Each jaw 15 and 20 is therefore provided with a tube gripping surface that is half round in a vertical plane and is curved in a horizontal direction to conform to the arc of the annulus it engages; so that the bag will not be flattened or otherwise distorted appreciably by the gripping action of these jaws.

A pair of lugs 26 (Figure 2) extend upwardly from the top plate 23 to receive a pivot pin 27. A block 28 is pivotally secured to the lugs 26 by the pin 27 and this block is secured to a piston rod 29 of a fluid operable cylinder 30. The upper portion of the cylinder 30 is pivotally attached at 31 to a bracket 32 fastened to the frame 1. By this arrangement the upper jaw may be moved out of clamping engagement with the curing bag 18 and into the dotted line position 33 of Figure 1 which provides sufficient clearance for the removal and positioning of curing bags into proper assembly with the lower set of clamping jaws. In order to insure proper registry of the upper jaw 20 with the lower jaw 15, we provide a guide plate 34 extending downwardly from the side plate 21. This guide plate 34 is adapted to register with a slot 35 formed in an extended portion 36 projecting from the side wall 13.

Since the upper jaw 20 and associated retaining plates are supported by the piston rod 29 through a pivot pin 27, it sometimes may occur that the jaw 20 is in such improper alinement with the axis of the cylinder 30 that the registering plate 34 will not be alined for complementary engagement with the slot 35. We therefore provide a spring mechanism for insuring that the jaw 20 will be maintained in proper alinement relative to the axis of the cylinder 30 when the jaw 20 is in close proximity to its engagement position with the curing bag 18. This alinement mechanism includes a bracket 37 (Figure 1) attached to the block 28 and adapted to support a pin 38 in axial slidable relation therewith. A collar 39 is attached to the pin and a spring 40 exerts a pressure against the collar whereby the pin presses against the top plate 23 which supports the jaw 20. A similar spring and pin arrangement is provided on each side of the block 28 with the result that the jaw 20 is maintained in correct alinement with the piston 30 and consequently it is adapted for proper alinement with the complementary jaw 15.

In order to move the carriages 5 and 6 along their supporting tracks we provide a pair of levers 41 and 42 pivoted to the upright member of the frame 1 at 43 and 44 respectively. The lower ends of the levers 41 and 42 are pivotally connected at 45 and 46 respectively to piston rods that slide in the fluid operable cylinder 47. This cylinder 47 is supported solely by the levers 41 and 42 and therefore it is in effect a floating cylinder capable of exerting pressure against both levers 41 and 42. The cylinder 47 is operated by a manually controlled conventional valve 48 having conduits 49 and 50 joining with the cylinder 47. One of these conduits admits fluid to extend the piston rods and the other operates to retract the piston rods. The conduit 51 leading to the valve 50 extends to a source of fluid supply under pressure. To complete the connections for moving the carriages 5 and 6, an arm 52 is pivotally attached to the lever 41 at 53 and is also pivotally attached to the carriage 6 at 54. In a similar manner an arm 55 is pivotally attached to the lever 42 at 56 and to the carriage 5 at 57. Therefore operation of the valve 48 to move the piston rods outwardly in the cylinder 47 causes the carriages 5 and 6 to move toward each other, and operation of the valve 48 to retract these rods will cause the carriages 5 and 6 to move away from each other.

The upper jaws 20 are moved simultaneously with the carriages 5 and 6. This is obtained by means of extension levers 58 and 59 forming a part of the levers 41 and 42 respectively. Arms 60 are pivotally attached to the lever 58 at 61 and are pivotally attached to the pin 27 of the support for the jaw 20. In a similar manner, arms 62 are pivoted to the lever 59 at 63 and are also pivoted to the pin 27 of the right hand unit of the jaw supporting means 20.

The cylinder 30 is operated by a conventional foot pedal type of air valve control 64. Conduits 65 and 66 extend from the air valve to the cylinder 30 while the conduit 67 extends to a source of fluid supply. One of the conduits 65, 66 serves to raise the piston rod 29 and the other serves to lower this piston rod. A similar valve and a similar system of conduits connects the second unit of the pair of cylinders 30 in like manner so that each of the cylinders may be operated independently.

A table top 68 supported by a pedestal 69 is used in combination with the apparatus for supporting the overhanging portion of the curing bag during the splicing operation. Preferably the table top is adjustable relative to the pedestal in order to accommodate different sizes of curing bags.

In the operation of the apparatus herein disclosed, a tube which is to form a curing bag is laid on the table 68 with its open end portions resting in the cavity of the lower jaws 15. Originally the curing bag tubes are cut to an approximate circumferential length and the final trimming operation takes place in the present apparatus. When the curing bag tube is positioned in the apparatus, the carriages 5 and 6 are in spaced relation as shown in Figure 1 and the upper jaw members 20 are locked out of the way in the dotted line position indicated by the reference character 33. When one end of the curing bag tube is positioned in proper relationship with the jaw 15, the operator presses the foot pedal connected with the valve 64 and one cylinder 30 is lowered so as to bring the upper jaw member 20 into clamping position with the lower jaw member 15. In a similar manner, the other of of the pair of cylinders is operated independently so as to clamp the opposite end portion of the curing bag tube. When both ends of the curing bag tube are properly clamped, an irregular end portion 70 is trimmed off by a hand operated knife so as to present an even and uniform portion of the curing bag projecting from the jaws 15 and 20. To accomplish this a U-shaped ring template 71 is placed over the extending portion of the curing bag 70 and serves as a guide against which a knife may be used to cut off the unwanted portion of the curing bag. When this operation is completed about one half inch of the curing bag stock extends from the clamping jaws. Both ends of the curing bag are trimmed and the template 71 moved from the apparatus. Thereafter the hand operated valve 48 is actuated which causes the carriages 5 and 6 to move slowly toward each other to the position shown in Figure 3. Slow movement is desirable so that when the butt splice is being formed, the plastic stock is given an opportunity to merge together in a slow knitting operation rather than by impact which would function merely to displace the stock. We have found that good knitting results can be obtained by operating the cylinder 47 so as to move the carriages 5 and 6 at the rate of about one foot per minute. When the curing bags are being spliced in this operation, it is to be understood that the curing bags are in an unvulcanized state and, therefore, the clean exposed butt surfaces of the curing bag when pressed tightly together in the present operation lose their identity to form an homogeneous bond. When the splice has thus been completed the operator actuates the foot pedal type valves 64 so as to elevate the upper set of jaws to the position indicated by 33 in Figure 1. Thereafter the curing bag is removed from the apparatus and the carriages 5 and 6 are activated to move them away from each other so that the apparatus will be ready for a similar cycle of operations.

As thus shown and described it is believed apparent that we have provided a novel apparatus which is capable of accurately and efficiently splicing curing bags in a manner which has been demostrated to be highly successful in the performance of the curing bag. While we have shown a preferred embodiment of our invention, it is to be understood that it is susceptible of those modifications which appear obviously in the spirit of our invention and as appearing in the scope of the appended claims.

Having thus described our invention, what we claim and desire to protect by Letters Patents is:

1. An apparatus for butt-splicing tubes to form tire curing bags comprising, a pair of upper clamping jaws and a pair of lower clamping jaws, each jaw having a clamping surface in substantial conformity with one-half of the cross-sectional perimeter of the curing bag so that two cooperating jaws hold the tube in a round condition in cross section, a frame, a horizontal track supported by the frame, a pair of carriages for supporting the lower clamping jaws adapted for movement along the track to advance the pairs of jaws, a pair of levers pivoted to the frame, a fluid operable cylinder having piston rods pivotally attached to the respective levers, an arm pivoted to each lever at a point between the cylinder pivot and the frame pivot and attached to the carriages whereby outward movement of the piston rods causes the carriages to advance toward each other, and a vertically disposed fluid operable cylinder pivotally attached to the frame and pivotally attached to one of the upper clamping jaws for moving the jaw away from and toward the lower clamping jaw.

2. An apparatus for butt-splicing tubes to form tire curing bags comprising, a pair of upper clamping jaws and a pair of lower clamping jaws, each jaw having a clamping surface in substantial conformity with one-half of the cross-sectional perimeter of the curing bag so that two cooperating jaws hold the tube in a round condition in cross section, a frame, a horizontal track supported by the frame, a pair of carriages for supporting the lower clamping jaws adapted for movement along the track to advance the pairs of jaws, a pair of levers pivoted to the frame, a fluid operable cylinder having piston rods pivotally attached to the respective levers, an arm pivoted to each lever at a point between the cylinder pivot and the frame pivot and attached to the carriages whereby outward movement of the cylinder piston rods causes the carriages to advance toward each other, a vertically disposed fluid operable cylinder pivotally attached to the frame and pivotally attached to one of the upper clamping jaws for moving the jaw away from and toward the lower clamping jaw, a continuation portion extending from each of the pair of levers, and connecting links pivotally joining the continuation portion with the pair of upper clamping jaws.

3. An apparatus for butt-splicing the two ends of a tube of plastic material while the tube is held round in cross-section and in the shape of an annulus to thereby form an annular tire curing bag, comprising concave upper and lower jaws for gripping one end of the tube, concave upper and lower jaws for gripping the other end of the tube, each jaw having its tube engaging surface curved to the arc of the portion of the tube annulus it engages and also curved so that it is half round in a plane at right angles thereto whereby a pair of cooperating jaws hold the portion of the tube they grip round in cross section, means for moving said jaws into and out of the tube gripping positions, and means for moving these pairs of jaws towards each other to force the ends of said tube together.

4. An apparatus for butt-splicing the two ends of a tube of plastic material while the tube is held round in cross-section to thereby form an annular tire curing bag, comprising concave upper and lower jaws for gripping one end of the tube, concave upper and lower jaws for gripping the other end of the tube, each jaw having a tube engaging surface that is half round so that a pair of jaws will provide a round tube opening and hold the portion of the tube they grip round in cross section, means for moving said jaws into and out of the tube gripping positions, and means for moving these pairs of jaws towards each other to force the round ends of the tube together.

5. An apparatus for butt-splicing the two ends of a tube of plastic material to form an annular tire curing bag, comprising concave upper and lower jaws for gripping one end of the tube and concave upper and lower jaws for gripping the other end of the tube whereby each pair of cooperating jaws hold the portion of the tube they grip round in cross section, means for advancing and retracting the lower clamping jaws toward and a way from each other along a horizontal path to force the ends of the tube together, and means for moving the upper jaws into and out of engagement with the cooperating lower jaws to clamp the tube in the jaws without flattening the inner walls one against the other.

6. An apparatus for butt-splicing the two ends of a tube of plastic material to form an annular tire curing bag, comprising concave upper and lower jaws for gripping one end of the tube and concave upper and lower jaws for gripping the other end of the tube whereby each pair of cooperating jaws hold the portion of the tube they grip round in cross section, means for advancing and retracting the lower clamping jaws toward and away from each other along a horizontal path to force the ends of the tube together, and means for moving the upper jaws into and out of engagement with the cooperating lower jaws to clamp the tube in the jaws without flattening the inner walls one against the other and so that these upper jaws move away from each other in the arc of a circle as they rise.

HAROLD S. PETERSON.
HAROLD A. ANDERSON.

REFERENCES CITED

The following references are of record in the file of this patent:

UNITED STATES PATENTS

| Number | Name | Date |
|---|---|---|
| 2,272,881 | Stevens | Feb. 10, 1942 |
| 2,273,463 | Campbell et al. | Feb. 17, 1942 |
| 2,273,464 | Campbell et al. | Feb. 17, 1942 |